(12) United States Patent
Rosemeier et al.

(10) Patent No.: US 11,740,166 B2
(45) Date of Patent: Aug. 29, 2023

(54) METHOD FOR DETERMINING ELASTOPLASTIC PROPERTIES AND THE FAILURE BEHAVIOR OF A TEST SPECIMEN

(71) Applicant: Fraunhofer-Gesellschaft zur Förderung der angewandten Forschung e.V., Munich (DE)

(72) Inventors: Malo Rosemeier, Bremen (DE); Thomas Gebauer, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 483 days.

(21) Appl. No.: 16/760,770

(22) PCT Filed: Nov. 2, 2018

(86) PCT No.: PCT/EP2018/080063
§ 371 (c)(1),
(2) Date: Apr. 30, 2020

(87) PCT Pub. No.: WO2019/086637
PCT Pub. Date: May 9, 2019

(65) Prior Publication Data
US 2020/0256774 A1    Aug. 13, 2020

(30) Foreign Application Priority Data
Nov. 3, 2017   (DE) .................. 10 2017 219 591.6

(51) Int. Cl.
*G01N 3/08*   (2006.01)
*G01M 5/00*   (2006.01)
(Continued)

(52) U.S. Cl.
CPC .............. *G01N 3/08* (2013.01); *G01M 5/005* (2013.01); *G01N 3/04* (2013.01); *G01N 3/32* (2013.01);
(Continued)

(58) Field of Classification Search
CPC ...... G01M 5/0016; G01M 5/005; G01N 3/08; G01N 3/04; G01N 3/32; G01N 2203/0016; F03D 17/00
(Continued)

(56) References Cited

U.S. PATENT DOCUMENTS

2015/0028608 A1*  1/2015  Wubbelmann .......... B66C 1/108
                                                           294/81.61
2016/0018284 A1   1/2016  Lee et al.
2016/0061688 A1*  3/2016  Van Wittenberghe .....................
                                                             G01M 5/0041
                                                                    73/577

FOREIGN PATENT DOCUMENTS

CN   102124315 A  *  7/2011   ............ G01M 5/005
DE   1156584 B        10/1963
(Continued)

OTHER PUBLICATIONS

"German Application Serial No. 10 2017 219 591.6, Examination Report dated Aug. 13, 2018", (Aug. 13, 2018), 5 pgs.
(Continued)

*Primary Examiner* — Octavia Davis Hollington
(74) *Attorney, Agent, or Firm* — Schwegman Lundberg & Woessner, P.A.

(57) ABSTRACT

Disclosed herein is a method for determining elastic properties of a test body by the use of tensile or compressive loading in a test stand, wherein a centroid line is defined for a longitudinal axis for the test body, centroid line miming through elastic centers of gravity of infinitesimally thick discs which lie orthogonally to the longitudinal axis and into (Continued)

which the test body can be divided. The test body is clamped at two clamping points by clamping devices, and a force is introduced at, at least one of the two clamping points in the direction of the respective other clamping point such that a line of action of a force introduced at, at least one of the clamping points is substantially parallel to a connection line between the two clamping points. Furthermore, by providing additional material or springs to the test body, the center of gravity line of the test body is converted into a modified centroid line of the entire system consisting of the test body and additional material or springs).

15 Claims, 4 Drawing Sheets (51) Int. Cl.
*G01N 3/04* (2006.01)
*G01N 3/32* (2006.01)
*F03D 17/00* (2016.01)

(52) U.S. Cl.
CPC ...... *F03D 17/00* (2016.05); *G01N 2203/0016* (2013.01)

(58) Field of Classification Search
USPC .......................................... 73/788
See application file for complete search history.

(56) References Cited

FOREIGN PATENT DOCUMENTS

| | | | | | |
|---|---|---|---|---|---|
| DE | 102009047364 | A1 | * | 6/2011 | .......... G01M 13/027 |
| DE | 102014208466 | A1 | | 11/2015 | |
| EP | 2749862 | A1 | | 7/2014 | |
| FR | 2894670 | A1 | * | 6/2007 | .............. G01N 3/04 |
| JP | 3081686 | | * | 8/2000 | |
| JP | 2008102041 | A | | 5/2008 | |
| JP | 2015166108 | A | * | 9/2015 | .......... B23K 20/123 |
| WO | WO-2014041739 | A1 | | 3/2014 | |
| WO | WO-2014161858 | A1 | | 10/2014 | |
| WO | WO-2019086636 | A1 | * | 5/2019 | ............ B64C 11/04 |

OTHER PUBLICATIONS

"International Application No. PCT/EP2018/080063, International Search Report dated Feb. 22, 2019", (Feb. 22, 2019), 2 pgs.

"International Application No. PCT/EP2018/080063, Written Opinion dated Feb. 22, 2019", (Feb. 22, 2019), 6 pgs.

"Canadian Application Serial No. 3,081,128, Office Action dated Feb. 23, 2023", (Feb. 23, 2023), 5 pgs.

"European Application Serial No. 18 800 874.2, Office Action dated Feb. 7, 2022", w/Machine Translation, (Feb. 7, 2022), 7 pgs.

* cited by examiner

METHOD FOR DETERMINING ELASTOPLASTIC PROPERTIES AND THE FAILURE BEHAVIOR OF A TEST SPECIMEN

PRIORITY APPLICATIONS

This application is a U.S. National Stage Filing under 35 U.S.C. § 371 from International Application No. PCT/EP2018/080063, filed on Nov. 2, 2018, and published as WO2019/086637 on May 9, 2019, which claims the benefit of priority to German Application No. 10 2017 219 591.6, filed on Nov. 3, 2017; the benefit of priority of each of which is hereby claimed herein, and which applications and publication are hereby incorporated herein by reference in their entirety.

The application relates to a method for testing test specimens, and in particular sub-components of wind turbines, such as components of wind turbine rotor blades, in test benches using uniaxial force application and force absorption.

The rotor blades of wind turbines are subjected to high loading and wear during operation. During the construction of wind turbines, and, in particular, during the development of the rotor blades, optimizing performance, while ensuring maximum possible safety, presents a major challenge. For this purpose, the elastic properties, such as modulus of elasticity, yield strength, strength, elongation at fracture, that is, the load capacity and the plastic and elastic deformability, and further structural characteristic values of the rotor blade should be known. Such characteristic values can be determined in test benches, for example, such as are used in methods according to the application. For this purpose, test specimens, that is, the components of the wind turbine rotor blades, for example, are clamped in the test bench and subjected to tension or compression load. In this way, for example, it is possible to record characteristic curves and to establish the forces or strains at which the test specimen breaks or fails. Due to the length of the rotor blades, which frequently exceeds 30 m, testing the blades is associated with great technical complexity and great time and financial expenditure. The complicated design of the rotor blades is an additional aggravating factor. The rotor blades frequently have a hybrid composition, comprising multiple materials, and/or have an anisotropic design, that is, for example, having different elastic properties in different spatial directions, and include cavities, recesses and/or reinforcements. It is not possible to employ material tests at coupon level for such test specimens, since the characteristic values are highly dependent on the structure and cannot simply be calculated from the material characteristic values. So as to implement realistic load conditions during the test, the direction and the point of application of the applied forces play a major role. Such realistic conditions can, in particular, be generated in sub-component tests. The sub-component tests can be carried out and controlled better than full-blade tests since the dimensions of the test specimens are smaller. Computer simulations can be employed to assist in the process, but cannot replace load tests in test benches.

According to the prior art, sub-components of wind turbines are measured, for example components of rotor blades having dimensions of several meters. Preferably, multiple components are taken from different locations of the rotor blade and measured in test benches. This can be used to draw conclusions as to the behavior of the entire rotor blade. To do so, conditions are simulated for the sub-components, which correspond to the conditions that are present when the sub-component is arranged in the rotor blade, and the latter is subjected to a load. So as to achieve such loading of the sub-component, the force is applied at the ends of the sub-component at previously calculated clamping points, which represent the force application points and are selected such that a load exerted on the sub-component corresponds to the load that the sub-component would experience at a particular loading of the entire rotor blade.

It is an objective of the application to describe a method that allows a force application in an efficient and controlled manner. In particular, a method according to the application can be used to control bending moments, and to reduce damaging forces on clamping devices used to clamp the test specimens.

This is achieved by a method according to independent claim 1 or according to independent claim 7. Advantageous embodiments will be apparent from the dependent claims.

Since the elastic properties of anisotropic test specimens having an inhomogeneous design, such as generally exist in the case of sub-components of wind turbines, are different in different directions, a longitudinal axis is defined as the reference axis. Any axis may be used for this purpose, which is referred to hereafter as the z axis of a body-fixed coordinate system. In the case of components stemming from wind turbine rotor blades, for example, the longitudinal axis or z axis can be defined as the axis perpendicular to the flange of the rotor blades. This means that the plane of the flange by which the rotor blades can be attached to the hub serves as a reference plane. The longitudinal axis can extend through the midpoint of the flange, for example. However, it is also possible to select a different reference axis or reference surface. In this way, a reference system can be defined, which is fixed on the test specimen.

During testing, the force is to be applied in the z direction, or with a component in the z direction, of the body-fixed coordinate system at outer surfaces of the test specimen that are intersected by the z axis. The outer surfaces can be situated perpendicularly to the z axis, parallel to the xy plane, or obliquely thereto. The direction of force has at least one component in the z direction or longitudinal direction.

The force is not to be applied into the outer surfaces across the entire surface, but at defined points of application. So as to be able to apply a force into the test specimen in this way, clamping devices are provided, which clamp the test specimen at clamping points located on the outer surfaces, and the test specimen is subjected to tension or compression load by way of the clamping devices. In this way, a punctiform, or approximately punctiform, or spatially delimited force application is made possible, that is, in particular, a force application that does not take place at the entire cut surface or outer surface of the test specimen.

Different load conditions can be generated by a targeted force application and selection of the clamping points.

The concept of lines of action is used to describe the force application at the clamping points, which represent the points of application. The lines of action shall be understood to mean the lines that indicate the position of a force in space. These extend parallel or coaxially to the force vector of an acting force and through the point of application of the force, that is, through the clamping points or through the clamping devices. These represent the extension of the force vector at infinity.

According to the invention, a force is applied at at least one of the punctiform clamping points. The clamping points are arranged such, and the directions of force are selected such, that a line of action of the force applied at at least one of the two clamping points extends parallel to a connecting line between the two clamping points. This means that the direction of force of the force applied at at least one of the two clamping points is selected in the direction of the respective other clamping point. This avoids shearing forces and/or torques, and the lines of action of all applied and absorbed force components essentially coincide in a single line of action. This configuration eliminates clamping shear forces.

For example, when a test specimen, during a load test, is subjected to a punctiform load at a first clamping point and at a second clamping point, as described above, accordingly tensile or compressive loading applied at a first clamping point, for example, is to take place with a direction of force essentially along a straight line connecting the two clamping points.

If the clamping points, and thus the force application points were to be shifted with respect to one another, so that these are not located opposite one another, and/or if the direction of force were to be changed, so that the lines of action of the applied forces no longer coincide in the connecting line of the clamping points, shear forces would arise at the clamping points, that is, force components that extend perpendicularly to the longitudinal axis. In the case of fixedly designed clamping devices, clamping moments arise in this circumstance.

According to the present application, clamping moments and clamping shear forces are to be prevented. Applied forces having a line of action that does not extend substantially in the direction of the connecting line between the clamping devices are thus not provided for.

In one embodiment, the force application is carried out exactly in the direction of the connecting line during the entire testing process, and in another embodiment, the force application is carried out at a predefined point in time, for example, at the beginning of the test process, in the direction of the connecting line, and thereafter does not deviate substantially from the connecting line.

A definition required to describe the subject matter of the application relates to the center of gravity line, or elastic center of gravity line, of a body or test specimen. When the test specimen is sliced perpendicularly to the defined longitudinal axis, that is, perpendicularly to the z axis, into infinitesimal disks, it is possible to calculate an elastic center of gravity for each disk. The elastic center of gravity is defined in that a prismatic body having the cross-section of the disk does not experience a bending moment when the force application at the top and bottom at this center of gravity takes place perpendicularly to the outer surfaces of the test specimen. In the case of prismatic bodies made of a homogeneous material, the elastic center of gravity is also the center of area. Inhomogeneous bodies having a modulus of elasticity that is variable across the area in the x and/or y directions have an elastic center of gravity, also referred to as a mathematical center of gravity, which does not correspond to the center of area, but is shifted toward regions having a greater modulus of elasticity, for example. Regarding the theory of the calculation of general elastic or mathematical centers of gravity, the "Lehrbuch der Technischen Mechanik—Elastostatik, Mit einer Einfuhrung in Hybridstrukturen (Text book of engineering mechanics—elastostatics, an introduction into hybrid structures)" by Rolf Mahnken, published by Springer-Verlag Berlin Heidelberg 2015, may be consulted. As an alternative, it is also possible to define two elastic axes for each infinitesimal disk of the test specimen, the point of intersection of which represents the elastic center of gravity. As a result, it is possible to define an elastic center line for a body, which extends through the elastic centers of gravity of each infinitesimal disk.

In a prismatic body (having a material composition that does not change in a direction perpendicular to the surfaces, that is, in the z direction in the present example), this center of gravity line extends in the z direction, perpendicularly to the cut surfaces.

The center of gravity line likewise exists in the general case of a non-prismatic body having a cross-section that changes along the direction perpendicular to the surfaces, in the z direction. This also applies to a body that has a prismatic geometry, but that has a material composition that changes spatially. The elastic center line then, in general, does not extend perpendicularly to the surfaces, and does not extend through the geometric centers of area. This may extend obliquely, for example, when the body becomes thicker or narrower on one side in the longitudinal direction, for example, that is, the center of gravity of the infinitesimal areas migrates across the length of the body. In the present application, the term 'center of gravity line' shall always be understood to mean a line through the elastic centers of gravity.

In such a general case, the center of gravity line may also have discontinuities or a curved or non-parallel progression with respect to the longitudinal axis or z axis, for example when the body has recesses on one side, or materials having different elastic properties are introduced on one side.

The distance between the center of gravity line in each infinitesimal disk of the test specimen and the line of action is defined as eccentricity.

If the line of action and the center of gravity line coincide, that is, if no eccentricity is present, no bending moment is applied into the test specimen, and the test specimen does not experience any bending during testing.

In a case in which the center of gravity line has a straight and continuous progression, a force can be applied concentrically by selecting the clamping points at the outer surfaces so as to coincide with the center of gravity line, and selecting the direction of force along the center of gravity line. The eccentricity disappears in each infinitesimal disk, and the test specimen does not experience any bending.

The force can also be applied with eccentricity to the center of gravity line, so that a bending moment is created by the lever arm between the center of gravity line and the line of action. The eccentricity at the upper clamping point can be greater or smaller than the eccentricity at the lower clamping point, so that a bending moment that is variable across the length of the test specimen is applied. The eccentricity can also be the same in each infinitesimal disk, so that a constant bending moment is applied into the test specimen. A bending moment is always applied on a test specimen having a discontinuous bending line.

Bending moments may be desirable or undesirable, depending on the test. The present application is to make it possible to modify applied bending moments and to reduce clamping shear forces.

When bending moments are applied on the test specimen, this may result in torsion of the test specimen outer surfaces with respect to one another. The test specimen outer surfaces then experience a rotation about the clamping points. When fixed clamping devices are used, clamping moments arise, which can have a damaging effect on the fixed clamping devices. The use of fixed clamping devices is thus disadvantageous in this case. According to the application, flexible clamping devices are used in this case, which tolerate torsion of the test specimen outer surfaces.

In the case of vanishing bending moments or when bending moments cancel each other out, so that no torsion of the test specimen outer surfaces takes place, cases of vanishing clamping moments exist, and it is also possible to use fixed clamping devices within the meaning of the application.

Flexible clamping devices can encompass, I-beams, universal joints or ball joints, for example. In an embodiment using I-beams, for example, two I-beams are provided on top of one another for each clamping device, which are preferably rotated by 90 degrees with respect to one another. Clamping devices can be assigned a preferred axis, so that the joint or the clamping device can be loaded with a force along a preferred direction. When the joint is undeflected, and loading in the direction of the preferred direction is present, greater loading is possible than when the joint is deflected or the clamping device is bent, without resulting in failure of the clamping device. In the case of a ball joint, for example, the axis that extends centrally through the ball and the shank is this preferred axis. When the joint is deflected, the joint shank and the housing rotate with respect to one another, and no loading takes place along the axis. In the example of two I-beams, the preferred axis extends through the point in which the two beams intersect, as seen from above. Such preferred axes result likewise for other possible clamping devices that may be used for methods within the meaning of the application.

In some methods according to the application, the test specimens are preferably clamped in such a way that, in the initial state, at the beginning of the method, or during another phase of the test process, for example during a final phase in which particularly high forces act, the force application takes place along these preferred axes of the two clamping devices. The two preferred axes then coincide, and essentially coincide with the line of action of the applied force, and thus with the connecting line between the clamping points. When flexible clamping devices are used with methods according to the present application, the line of action of the applied force in each case preferably deviates by no more than 30 degrees from the preferred direction of the two flexible clamping devices, and particularly preferably by no more than 30 degrees.

In methods according to the application, flexible clamping devices are preferably deflected by no more than 30 degrees, and particularly preferably by no more than 20 degrees.

When clamping points as described above are selected, and the clamping devices are arranged such that the lines of action of all forces coincide at least substantially with the preferred axes of the clamping devices, at least during a defined phase, and no undesirable shear force components arise, a ball joint designed for a load of 200 to 400 kN can also be loaded, at least during this phase, with at least approximately 200 to 400 kN along the longitudinal direction. Methods within the meaning of the application are carried out, for example, using forces between 1 kN and 5000 kN, preferably using loads between 100 and 1000 kN, and particularly preferably using a load between 200 and 800 kN. In practice, the maximum load has to be reduced during testing in the case of methods that do not correspond to the application, in which clamping moments and clamping shear forces occur, so as to prevent excessive wear or failure of the joints. This means, for example, that joints designed for a load of 400 kN or more have to be used, to be able to achieve a load along the longitudinal axis of 200 kN during testing.

Creating the load conditions in the sub-component necessary for testing is associated with computing complexity on the one hand, since the clamping points theoretically have to be pre-calculated, and, on the other hand, creating these conditions presents a technical challenge since the force application is to take place in a very targeted manner along particular lines into the subcomponent, that is, the sub-component has to be clamped and attached so that such a force application is possible in the first place.

In some embodiments, a sub-component is cut out or manufactured such that two mutually opposing outer surfaces are created, which are perpendicular to the z axis, for example. The surfaces are then both situated parallel to the xy plane. The force application can take place at clamping points on both surfaces, perpendicularly to these surfaces in the z direction. In contrast to the conventional testing of sub-components, the present application is not limited to such cuts or force application directions. It is also possible to select oblique opposing, or substantially opposing, outer surfaces, which are intersected by the longitudinal axis or z axis. Using a frame or an accordingly modified clamping device, it is also possible, with oblique outer surfaces, to achieve that the preferred axes of the two clamping devices are situated in one line and coincide with the line of action of the applied force, or such that the preferred axis of each flexible clamping device in each case deviates by no more than 30 degrees from the line of action of the applied force, and preferably by no more than 20 degrees, and/or that the flexible clamping devices are deflected by no more than 30 degrees, and preferably by no more than 20 degrees.

When testing a test specimen, there are instances in which bending moments are desirable, and instances in which bending moments are to be precluded, depending on which type of loading is desired. For example, so as to be able to simulate conditions, when testing sub-components, that would prevail if the sub-component were installed inside the rotor blade, without placing excessive loads on the clamping devices, it is advantageous to be able to control the bending moments, that is, to enable or preclude these, or to reduce or to increase these, in a targeted manner. Such a control of the bending moments is likewise an integral part of the present application and is described hereafter.

So as to be able to arbitrarily increase, decrease or preclude the bending moments, the above-defined elastic center lines of the test specimen are modified in methods according to the application, and are aligned in relation to the line of action of the applied force, depending on the desired use.

The application resorts to a method for modifying the center of gravity lines. By mounting additional material or springs, the center of gravity line of the test specimen can be converted into a preferably previously known modified center of gravity line of an overall system comprising the test specimen and the additional material or springs. For this purpose, the additional material or the springs are mounted on at least one side of the test specimen. On one side shall be understood to mean that the material or the springs are mounted on or next to one of the lateral surfaces of the test specimen, which are precisely not the outer surfaces intersected by the longitudinal axis, so that the additional material or the springs extend in at least a portion of the infinitesimal disks. The infinitesimal disks extend beyond the outer dimensions of the actual test specimen in the process, so as to include the additional material or the springs. In this way, the elastic center of gravity of the respective disk, and thus the progression of the center of gravity line, are changed in each infinitesimal disk in which additional material or springs are present.

The application furthermore resorts to a method in which the eccentricities of the two clamping points can be set by tilting the workpiece about an axis in the xy plane, prior to clamping. The applied force furthermore has a line of action along the connecting line between the clamping points. However, the bending moments can be varied by the selection of the eccentricities.

During the creation of sub-components, additional material can be provided by a different selection of the preferably previously calculated cut, for example. The sub-component can also be manufactured per se from the start. During creation, additional material can already be mounted in certain locations, wherein the additional material is not provided at the corresponding location in the working state, for example as part of a wind turbine. Additional material, for example in the form of springs or another elastic material, however, can also be provided by being subsequently mounted on the test specimen. The additional material can be laminated or glued on, or it is possible to laminate or glue on T-beams or I-beams, which are then connected to springs.

When a homogeneous, prismatic test specimen is present in one example, at the outer surfaces of which a force is applied at the elastic centers of gravity, without eccentricity, in accordance with the application, the line of action of the applied force coincides with the center of gravity line, and the test specimen does not bend. If the bending behavior is now to be examined, the center of gravity line can be converted, in accordance with the application, into the center of gravity line of an overall system comprising the test specimen and, for example, springs. When, for example, a spring is mounted on one side of the test specimen across the full length of the test specimen, the center of gravity line of the overall system is shifted parallel to the lines of action of the applied and absorbed forces, and a bending moment is applied, since the clamping points then each have eccentricity with respect to the center of gravity line, wherein the eccentricities are identical. In this way, a different load can be created in the test specimen, without changing the clamping points.

When, in another instance, for example, a non-prismatic test specimen is present, or an inhomogeneously composed test specimen is present, in which the center of gravity line has a discontinuity or a bend or a convexity, it is not possible to readily prevent bending moments, since the lines of action, which are defined as straight lines, cannot coincide with the discontinuous or curved center of gravity line. As a result, bending moments occur during the testing of such a body. These result in bending and thus, in the case of flexible clamping which allows torsion, results in torsion of the test specimen outer surfaces, at which the test specimen is clamped, with respect to the clamping devices. In some embodiments, such bending or torsion is undesirable.

In one embodiment, a test specimen having discontinuous or non-constant rigidity, for example a test specimen having the same rigidity at the two clamping points, and having a discontinuity in a central region of the center of gravity line, is clamped using clamping devices so that the two clamping points do not have eccentricity with respect to the center of gravity line at the ends of the test specimen, and the line of action of the applied force at the beginning is congruent to the axes of the clamping devices. Due to the discontinuity, a bending moment is then applied in the region of the discontinuity in conventional methods, since the line of action and the center of gravity line deviate from one another in the central region. So as to be able to tolerate bending moments and the associated torsion of the outer surfaces, in one embodiment the test specimens are movably clamped by way of flexible structures, for example I-beams or universal joints or ball joints, serving as clamping devices, so that bending of the body, and thus torsion of the test specimen outer surfaces, at which the body is clamped, with respect to the clamping devices is made possible.

In one embodiment of the application, excessive torsion of the test specimen outer surfaces, at which the test specimen is clamped, with respect to the clamping devices is eliminated by reducing bending moments in a controlled manner. Within the meaning of the application, the bending moment can be eliminated by connecting additional rigidities in parallel in the region of the discontinuity. The rigidities can be springs, for example, or another additional material. Preferably, springs having a known spring constant are used, which can be purposefully used and the contribution of which is known, for example, from prior calculations, or which can be subtracted based on subsequent calculations, for example numerical calculations. The springs or the additional material change the position of the elastic center of gravity in the infinitesimal planes through which they extend. In an infinitesimal plane through which additional material or a spring extends, the elastic center of gravity is shifted toward the additional material or the spring, for example. Depending on the material property and spring constant, the additional material or the springs have a higher or a lower modulus of elasticity, and the center of gravity is thus shifted to a greater degree or lesser degree in the direction of the additional material. In this way, the discontinuous center of gravity line can be converted into a continuous center of gravity line, extending in a straight manner, of an overall system comprising the test specimen and the additional material or the springs. In one embodiment, the center of gravity line is modified by the mounting of rigidities in such a way that the bending moments are decreased, so as to reduce the torsion of the outer surfaces with respect to the clamping devices, and to subject the clamping devices to less stress. In another embodiment, the center of gravity line is modified by the mounting of rigidities so as to become congruent with the line of action of all forces applied and/or absorbed at the clamping points, and all bending moments disappear. In one variant of the latter design, flexible clamping devices, such as I-beams, ball joints or universal joints, are then completely dispensed with, and, instead, rigid clamping devices are used, which, for example, are less prone to wear or less expensive and/or allow a larger force to be applied.

In a further method according to the application, a bending moment is to be applied into the test specimen so as to generate corresponding bending stresses and measure the association elongation or strain, or so as to test the effect of the bending moment on the test specimen. For example, a non-constant bending moment is applied along the longitudinal axis when each of the two clamping points has a different eccentricity, that is, a different distance, with respect to the center of gravity line. Instead of shifting the clamping points with respect to one another for this purpose so as to achieve the desired eccentricity at the upper and lower ends of the test specimen, which would result in clamping shear forces, the test specimen, and with it the center of gravity line thereof, can be tilted in accordance with the application so that the clamping points have the desired eccentricity. The force application then continues to take place such that the line of action of the applied force extends through the connecting line between the clamping points. The clamping devices are preferably arranged so that the preferred axes thereof likewise coincide with the line of action, or at least deviate by no more than 30 degrees from the line of action, preferably by no more than 20 degrees, for example using an accordingly designed frame. Based on the selected eccentricities, it is then possible for the body to bend, which is advantageously made possible through the use of flexible clamping devices, such as ball joints or universal joints. Since the arrangement of the clamping points advantageously eliminates or reduces clamping moments and clamping shear forces, an economical use of the joints is made possible.

In addition to, or as an alternative to tilting the test specimen, it is also possible, according to the application, to apply bending moments on the test specimen by converting the center of gravity line of the test specimen into the center of gravity line of an overall system comprising the test specimen and the additional material, by mounting additional rigidities, such as additional material or springs.

It is also possible to mount additional material or springs on several sides of the test specimen, for example in different segments along the z axis, so as to apply different bending moments in the different segments.

It is also possible to arrange multiple springs in the z direction on top of one another on one side of the test specimen and to attach each to the body, wherein the springs have different spring constants. For example, the springs can be arranged in such a way that the spring constants of the springs decrease in a positive z direction, and the center of gravity line of the overall system is thus tilted and shifted with respect to the lines of action. The clamping points thus each have a different eccentricity with respect to the center of gravity line of the overall system, and a bending moment that is not constant across the length of the test specimen is applied. Further configurations, for example springs that are not mounted on the entire length, for introducing a discontinuity are likewise possible.

It is also possible to mount additional material on one side of the test specimen, the additional material tapering in one direction, whereby the center of gravity line of the overall system comprising the test specimen and the additional material is likewise tilted and shifted with respect to the center of gravity line of the test specimen so as to apply a non-constant bending moment.

In embodiments in which bending moments are applied into the test specimen, the clamping devices can be configured such that, at the beginning of the method, the force application takes place along the preferred direction of the clamping devices and, during testing, the body bends only little, for example thanks to mounted springs or additional material and/or due to accordingly selecting tilting, so that the force application continues to take place essentially along the preferred direction of the clamping devices.

In some embodiments, the benefit of controlling or reducing the bending moments can be to reduce the torsion of the test specimen outer surfaces, at which the body is clamped, with respect to the clamping devices. In other embodiments, the benefit can be to generate different loading for the test specimen in a targeted manner. Both advantages can be combined with one another in some embodiments.

In one embodiment, the bending properties of a test specimen are simulated prior to clamping in the test bench, using a computer program, and, for example, suitable tilting of the body prior to clamping, suitable clamping points, and suitable spring configurations or configurations of additional material are calculated.

The embodiments comprising additional material or springs and the embodiments in which the test specimen is tilted prior to clamping can advantageously be combined with one another.

Methods within the meaning of the application can be used in test specimens of all kinds, and the described methods are particularly advantageous for large test specimens having complex cross-sections, in particular test specimens that are composed of multiple materials or that include recesses, or test specimens that are substantially hollow and include reinforcing structures, such as components of wind turbine rotor blades. The method is particularly suitable for test specimens that have a length between 1 cm and 15 m, and preferably between 1 m and 10 m, in a longitudinal direction of the z axis, or in a direction extending substantially along the line of action of the overall force resulting from the applied forces.

When the force, as is provided in the application, is not applied across the entire surface, but, as described, only in a punctiform or spatially delimited manner by way of clamping devices, undesirable deformation can be avoided by the use of a rigid frame by plates, which are arranged on the outer surfaces of the test specimen. The force application then takes place by way of the plate. The line through the clamping point or the clamping device shall continue to be understood to be the line of action. In one embodiment, the surface is only shifted and/or rotated as a whole. In one embodiment, a rigid frame is provided, which is glued to the test specimen edges or surfaces, for example.

Embodiments of the application and explanatory examples regarding the application can be found in the figures. In the drawings.

Figure 1:
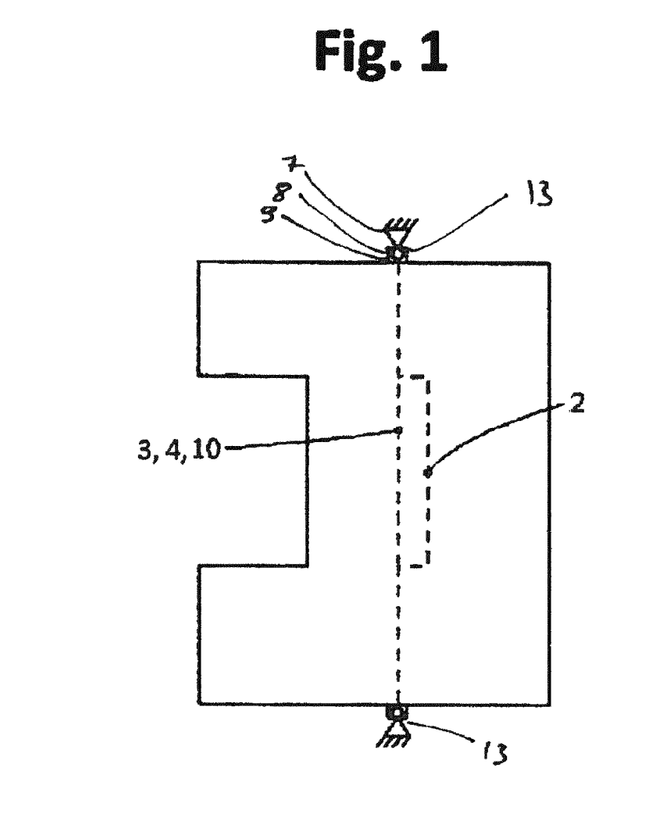
FIG. 1 shows a test specimen having a discontinuous center of gravity line.

FIG. 1 shows a test specimen 1, having a geometry that is such that the test specimen has a discontinuous center of gravity line 2. The center of gravity line 2 is the line that extends in a homogeneous material, having a constant modulus of elasticity throughout, through the geometric centers of area of the areas perpendicular to a longitudinal axis of the body, which defines a z axis. In the case of a component of a wind turbine rotor blade, for example, the longitudinal axis can be the axis that extends perpendicularly to a plane defined by the flange of the rotor blade, through the center of the flange. In an inhomogeneous material, having a variable modulus of elasticity in space, the center of gravity line extends through the elastic centers of gravity, which, in general, do not have to be identical to the geometry centers of area. Due to a material recess in a central region of the test specimen 1 shown in the figure, the elastic center of gravity shifts in this central region, and the center of gravity line has a discontinuity. The test specimen 1 is clamped at two clamping points by way of two clamping devices 13, wherein the two clamping devices have no eccentricity with respect to the center of gravity line 2. A force is applied in the direction of the respective other clamping point at at least one of the two clamping points. The line of action 10 of the applied force thus extends through both clamping points and parallel to the longitudinal axis of the test specimen. Such an arrangement avoids the presence of additional force components, having lines of action that do not extend parallel to the connecting line of the clamping points. Moreover, the line of action 10 coincides, at least at the beginning of the test process, with preferred directions 3, 4 of the clamping devices 13. The preferred directions 3, 4 of the clamping devices 13 are the axes that extend centrally through the undeformed clamping devices 13. Due to the discontinuity in the center of gravity line, the center of gravity line and the lines of action do not coincide in the central region, and bending moments arise in this configuration, which result, for example, in torsion of the test specimen outer surfaces, at which the test specimen is clamped, with respect to the clamping devices 13. In this example, the clamping devices 13 are thus designed as ball joints, comprising a joint shank 7, a joint ball 8 and a joint housing 9, so as to allow the test specimen to bend. During a later phase of the test process, when the test specimen is deformed, the flexible clamping devices are deflected. The joints are preferably deflected by no more than 30 degrees, and particularly preferably by no more than 20 degrees.

Figure 2:
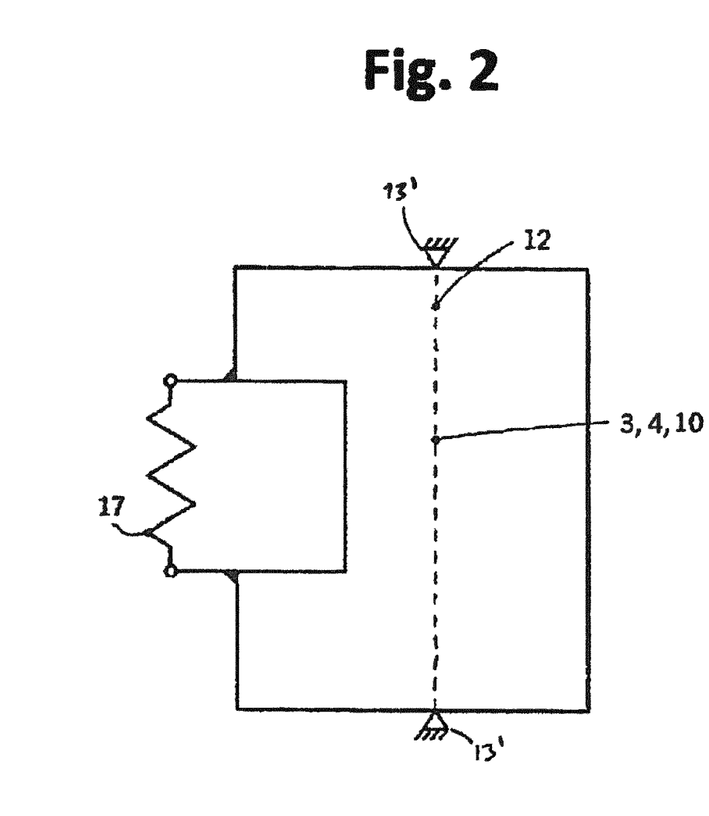
FIG. 2 shows a test specimen including a spring for modifying the center of gravity line.

FIG. 2 shows the test specimen 1 from FIG. 1, which is provided with an additional rigidity in the form of a spring 17 here. The spring 17 is configured and positioned such that the original center of gravity line 2 converts into a modified center of gravity line 12 of the overall system comprising the test specimen 1 and the spring 17. For this purpose, the spring has such a modulus of elasticity, and is arranged such, that the elastic center of gravity, in the region of the discontinuity, is shifted so far in the direction of the spring that the discontinuity is eliminated. The center of gravity line 12 of the system comprising the spring 17 and the test specimen 1 coincides with the line of action 10 of the forces applied at the clamping devices 13'. The overall system comprising the test specimen 1 and the spring 17 then has a continuously and linearly extending center of gravity line 12, such as is present, for example, in homogeneous prismatic bodies. No bending moments arise, and the outer surfaces thus do not rotate with respect to the clamping devices 13'. As a result, a force can always be applied along the preferred directions 3, 4 of the clamping devices 13', and the clamping devices 13' can be utilized particularly well or be configured as fixed clamping devices. A deformation or a depression of the surfaces of the test specimen at which the force is applied can be prevented, for example, by placing rigid plates onto the surfaces. However, the spring 17 can also be configured such that the bending moment is only reduced, without being entirely eliminated, so that the center of gravity line continues to have a discontinuity, but a smaller discontinuity than before, so as to reduce torsion damaging the joint. In this case, flexible clamping devices 13 should still be used.

Figure 3:
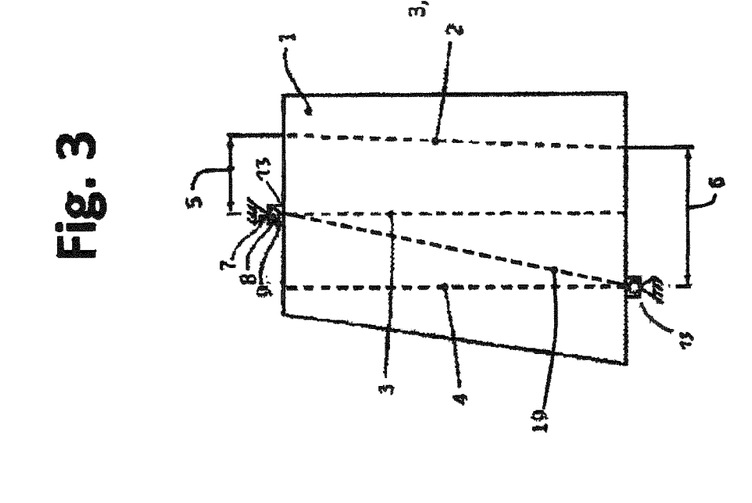
FIG. 3 shows a test specimen having clamping points arranged in an offset manner for generating a bending moment.

FIG. 3 shows a test specimen 1 having a center of gravity line 2. As seen from top to bottom, the center of gravity line 2 extends slightly from right to left. So as to apply a desired bending moment, the clamping points have different eccentricities 5, 6 with respect to the center of gravity line, wherein in the shown example a first eccentricity 5 at an upper end of the test specimen 1 is smaller than a second eccentricity 6 at a lower end of the test specimen 1.

The two clamping devices 13 are arranged offset from one another for this purpose. The preferred axes 3, 4 of the clamping devices also do not coincide with one another here. The offset clamping devices create a lever arm, and forces perpendicular to the test specimen outer surfaces arise. In the method, clamping devices 13 are subjected to high shear loads since these have to absorb torque that is applied onto the test specimen. The overall force present at the respective clamping devices 13 has components along the preferred axes 3, 4 of the clamping devices and components perpendicular to the preferred directions 3, 4. The latter force components are the shear forces to be avoided within the meaning of the application since these can have a damaging effect on the clamping devices. The design shown here is therefore to be considered to be disadvantageous.

Figure 4:
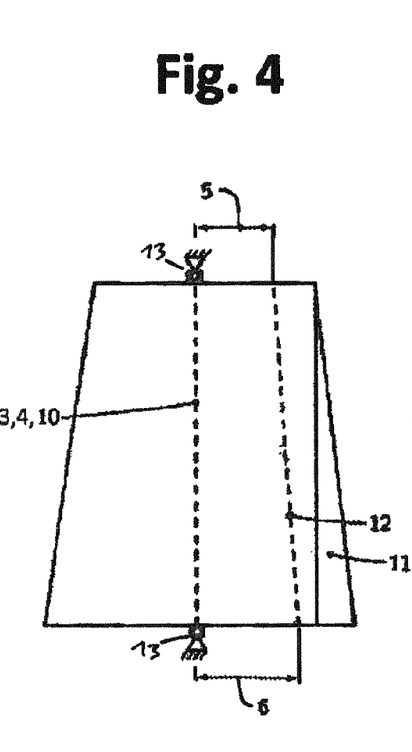
FIG. 4 shows a test specimen having clamping points arranged on top of one another and additional material for generating a bending moment.

FIG. 4 shows the test specimen 1 from FIG. 3. The two clamping devices 13 are arranged such, and the forces are applied such, that the line of action 10 extends through the two clamping points. Moreover, this resulting line of action 10 coincides, at least at the beginning of the test process, with the preferred axes 3, 4 of the clamping devices. So as to achieve a desired bending stress, similarly to the bending stress in the arrangement of FIG. 3, additional material 11 is provided on one side of the test specimen. In the case of subcomponents that are cut from a larger piece, a different cutting line may be selected for this purpose, so as to obtain additional material 11 on one side. However, the subcomponent may also be manufactured accordingly from the start, or the additional material 11 may be attached subsequently to the test specimen. For example, the additional material 11 is designed in terms of shape and/or rigidity so as to vary in the extension thereof or in the elasticity properties thereof across the length. In the shown example, the additional material is tapered toward an upper end. In this way, the original center of gravity line 2 of the test specimen from FIG. 3 is converted into a modified center of gravity line 12 of the overall system comprising the test specimen 1 and additional material 11, as shown in FIG. 4. In each cutting plane, the elastic center of gravity shifts toward the additional material, and different loading of the test specimen than would be achieved without additional material, using the same force applied, is achieved in a targeted manner. In areas where the additional material is thicker, the center of gravity shifts to a greater degree. Due to the configuration of the additional material, the center of gravity line 12 is tilted compared to the center of gravity line 2. As seen from top to bottom, the center of gravity line 2 in FIG. 3 extends slightly from right to left, whereas, as seen from top to bottom, the modified center of gravity line 12 extends slightly from left to right. In relation to the line of action 10, the center of gravity line 12 thus modified is positioned such that each of the two clamping points has a different eccentricity 5, 6, wherein, in the example shown in the figure, a configuration in which a first eccentricity 5 at an upper end of the test specimen 1 is smaller than a second eccentricity 6 at a lower end of the test specimen 1, similarly to what was aspired in FIG. 3, is now ensured with coinciding lines of action of the resulting force components 10. Using the design from FIG. 4, similar bending moments as those in FIG. 3 can thus be applied into the test specimen, however clamping shear forces are eliminated or reduced, so that the strain of the clamping devices 13 is considerably lower than in FIG. 3. As a result, the test specimens can be subjected to a greater load, or smaller joints can be used with the same force application, and thus costs can be saved. Since the outer surfaces of the test specimen can rotate in relation to the clamping devices as a result of the bending moments, the clamping devices 13 are advantageously designed as ball or universal joints here. For example, the clamping devices 13 are configured such that the force application along the line of action 10 at the same time takes place along the preferred axes 3, 4 of the clamping devices. Due to different configurations of the additional material, the center of gravity line 12 of the overall system comprising the test specimen 1 and additional material 11 can be modified in different embodiments in a targeted manner.

Figure 5:
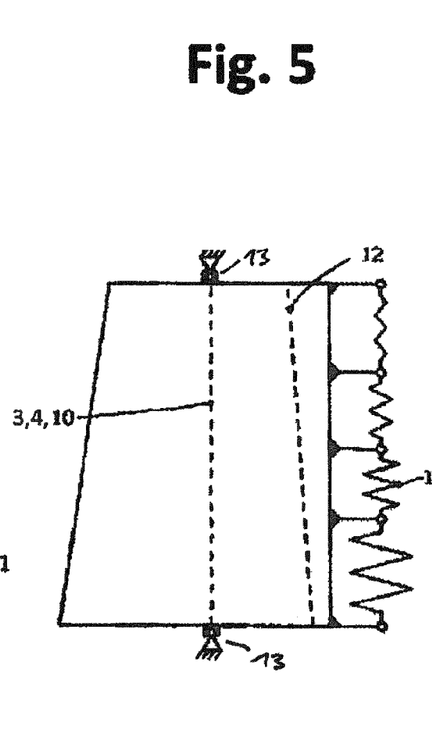
FIG. 5 shows a test specimen having clamping points arranged on top of one another and springs for generating a bending moment.

FIG. 5 shows a configuration similar to the configuration from FIG. 4, wherein, instead of additional material 11, springs 17 are mounted on one side of the test specimen and attached at multiple points on the body. The effect of the springs 17 on the modified center of gravity line 12 in this example is similar or identical to the effect of the additional material 11 in the example from FIG. 4. Multiple springs are arranged on top of one another, parallel to the test specimen, wherein each spring is connected to the body at an upper end and a lower end. The springs thus connected can each have different spring constants. In the shown example, an upper spring has the smallest spring constant, and the springs located further down have increasingly larger spring constants from top to bottom. In areas where the springs having larger spring constants are arranged, the elastic center of gravity shifts more strongly in the direction of the springs than in areas where the springs having a smaller spring constant are arranged. In this way, an effect similar to the tapering of the additional material 11 from FIG. 4 is achieved. Compared to the mounting of additional material 11, the mounting of springs 17 can have practical advantages in some instances, since the springs are easily replaceable, and spring having a wide variety of properties, and precisely known properties, are readily available, so that center of gravity lines can be modified particularly advantageously by the selection of the springs.

Figure 6:
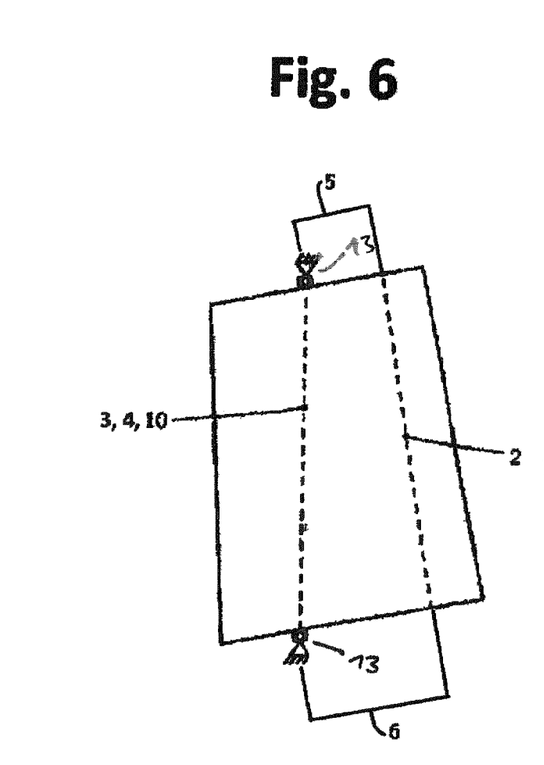
FIG. 6 shows a tilted test specimen having clamping points arranged on top of one another for generating a bending moment.

FIG. 6 shows the test specimen from FIG. 3 including the center of gravity line 2. So as to achieve a desired bending stress, which may correspond to or resemble the resulting loading of the configuration from FIG. 3, an arrangement is again selected in which a first eccentricity 5 at an upper end of the test specimen 1 is smaller than a second eccentricity 6 at a lower end of the test specimen 1. In the example shown in FIG. 6, this is carried out such, in accordance with the application, that the line of action of the applied force extends through the two clamping points, and no further force components, such as shear forces, arise. In contrast to the approach shown in FIG. 3, in this case this takes place by tilting of the test specimen prior to clamping, instead of by shifting of the clamping points. By changing the position of the test specimen 1 in space such that the lines of action 10 of the applied and absorbed forces are substantially congruent, or are congruent, damaging clamping shear forces can be reduced or eliminated. The clamping devices 13 can be configured such that a force application along the line of action 10 at the same time extends along the preferred axes 3, 4 of the clamping devices 13, and the joints are deflected by no more than 30 degrees, and particularly preferably by no more than 20 degrees.

The embodiments from FIGS. 4, 5 and 6 can advantageously be combined with one another, for example when practical limitations exist for the mounting of additional material or springs, or when practical limitations exist for tilting of the test specimen.

Figure 7A:
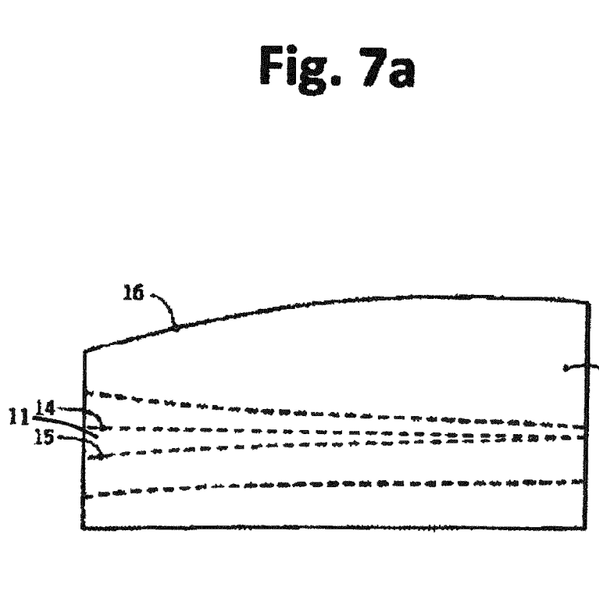
FIGS. 7a and 7b show a side view and a cross-sectional view of a portion of a wind turbine rotor blade including lines that indicate the progression of the sub-components.
Figure 7B:
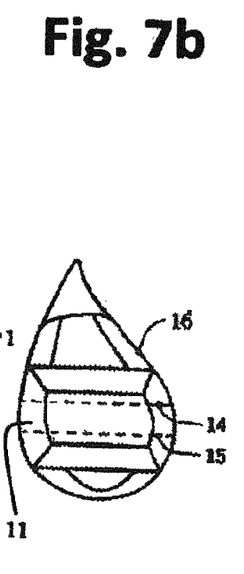

FIGS. 7a and 7b show a portion of a wind turbine rotor blade 16 in a side view (a) and in a cross-sectional view (b). So as to test certain properties of the wind turbine rotor blade according to the application, a component is cut out of this portion, which represents the test specimen 1. If the test specimen 1, the properties of which are to be measured, is given by a first line 14, for example, it may be advantageous within the meaning of the application to select a cut along a second line 15. In this way, an overall system comprising the test specimen 1 and additional material 11 is created, which can then be measured on a test bench, and which allows conclusions to be drawn as to the test specimen 1. The cross-sectional view shown in FIG. 7b illustrates the non-trivial structure of the test specimen 1 or of the wind turbine rotor blade. Such test specimens, which, in addition to a complicated geometric progression, can also have inhomogeneities in the material composition thereof, whereby the center of gravity lines thereof may become further complicated, can be analyzed, for example, in a preparatory step using computer programs. It is then possible to select material or spring configurations according to FIG. 4 or 5. In addition, tilting of the test specimen according to FIG. 6 can be selected so as to reduce the load of the clamping arrangement.

Figure 8A:
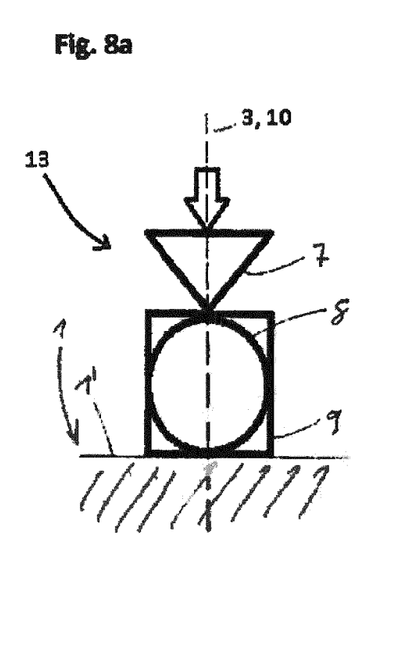
FIGS. 8a and 8b show clamping devices, designed as a ball joint (a), or composed of I-beams (b) with a portion of the test specimen, with force application along the preferred direction of the clamping devices.
Figure 8B:
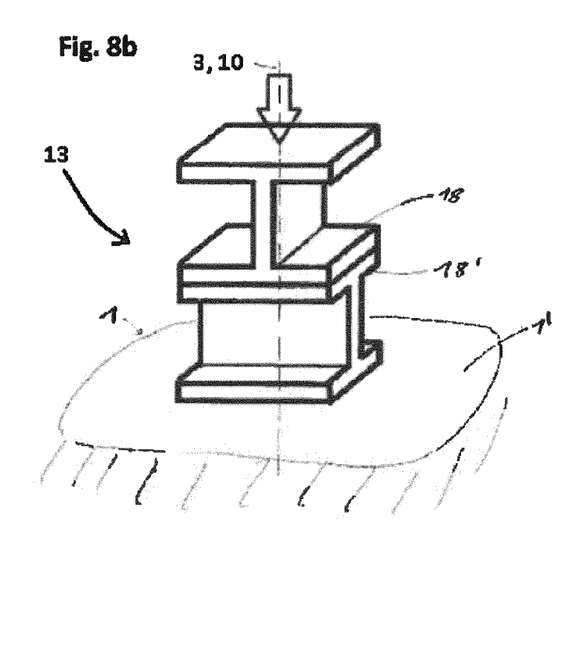

FIGS. 8a and 8b show flexible clamping devices 13 by way of example, including a portion of a test specimen 1. The clamping devices 13 have a preferred axis 3, which extends centrally through the non-deflected clamping devices 13. For example, loads are advantageously selected along the plotted arrows. With appropriate force application or clamping on the opposite side (not shown), a line of action 10 can then coincide with the preferred axis 3 of the clamping device 13 and with the preferred axis 4 of the opposite clamping device, which is not shown, wherein no further force components that do not act in this line of action are present. In some instances, the body experiences bending over the course of the test process. The outer surfaces 1' then rotate and cause bending or deflection of the movable clamping devices 13. FIG. 8a shows a clamping device 13 designed as a ball joint, comprising a joint shank 7, a joint ball 8, and a joint housing 9, which is connected to the test specimen 1. A preferred axis 3 of the ball joint extends centrally through the ball joint 8 and the ball shank 7 and coincides with the line of action 10 of the resulting overall force that is applied by way of the ball joint. The force applied is represented by way of an arrow. The force is applied by way of the clamping device 13 onto the test specimen 1, or onto the test specimen outer surface 1', or a plate arranged on the test specimen outer surface 1', which can prevent the test specimen outer surface 1' from being depressed. When the body experiences bending under load, the test specimen outer surface rotates, and the ball joint is deflected, that is, the joint shank 7 and the joint ball 8 remain fixed, and the joint housing 9 rotates together with the test specimen outer surface 1' about the joint ball 8. FIG. 8b shows a similar circumstance as FIG. 8a for a clamping device configured of two I-beams 18, 18'. The preferred axis is defined as the axis through the point of intersection of the two I-beams (top view), perpendicularly to the upper and lower surfaces of the I-beams. The force application along the line of action 10 again coincides with this preferred axis. When the test specimen outer surface 1' is rotated, at least one of the two I-beams 18, 18' bends.

LIST OF REFERENCE NUMERALS 1 test specimen
1' outer surface of the test specimen 2 center of gravity line
3, 4 preferred axes of the clamping devices
5 eccentricity
6 eccentricity
7 joint shank
8 joint ball
9 joint housing
10 line of action
11 additional material
12 modified center of gravity line
13 flexible clamping device
13' rigid clamping device
14 component cut
15 component cut
16 portion of a wind turbine rotor blade
17 springs
18, 18' I-beam
19 connecting line between the clamping points

The invention claimed is:

1. A method for determining elastic properties of a test specimen by way of tensile or compressive loading in a test bench, the method comprising:
defining a centroid line for the test specimen for a longitudinal axis, which extends through an elastic centroid of at least one disk situated perpendicularly to the longitudinal axis and into which the test specimen is capable of being divided;
clamping the test specimen at a first clamping point and a second clamping point using a first clamping device and a second clamping device, the clamping devices being configured for a punctiform or approximately punctiform force application at the clamping points; and
applying a force in a direction of a respective other of the first clamping point or the second clamping point, so that a line of action of the force applied extends substantially parallel to a connecting line between the first clamping point and the second clamping point, a direction of the force having at least one component along the longitudinal axis;
wherein by providing at least one of an additional material or a spring on the test specimen, the centroid line of the test specimen is converted into a modified centroid line, and wherein the modified centroid line is directed through the test specimen and the additional material or the spring, to adjust one or more bending moments acting during force application.

2. The method according to claim 1, wherein the centroid line is converted into the modified centroid line by mounting the additional material or the spring, the modified center of gravity line being selected so as to coincide with the line of action of the force applied at the respective other of the first clamping point or the second clamping point.

3. The method according to claim 2, wherein the first clamping device and the second clamping device clamp the test specimen to inhibit or prevent torsion or bending of the test specimen during a test process.

4. The method according to claim 1, wherein at least one of the first clamping point or the second clamping point has an eccentricity with respect to the modified centroid line.

5. The method according to claim 1, wherein the test specimen is clamped in a tilted manner so that at least one of the first clamping point or the second clamping point has a predefined eccentricity with respect to the modified centroid line.

6. The method according to claim 1, wherein the spring or the additional material is arranged on at least one side of the test specimen.

7. The method according to claim 1, wherein a plurality of springs are arranged in series on at least one side of the test specimen.

8. The method according to claim 7, wherein each spring of the plurality of springs have a single spring constant.

9. The method according to claim 7, wherein each spring of the plurality of springs have different spring constants.

10. A method for determining elastic properties of a test specimen by way of tensile or compressive loading in a test bench, the method comprising:
defining a centroid line for the test specimen for a longitudinal axis, which extends through an elastic center of gravity of a disk situated perpendicularly to the longitudinal axis and into which the test specimen is capable of being divided;
clamping the test specimen at a first clamping point and a second clamping point using a first clamping device and a second clamping device, the clamping devices being configured for a punctiform or approximately punctiform force application at the clamping points; and
applying a force in a direction of a respective other of the first clamping point or the second clamping point, so that a line of action of the force applied extends substantially parallel to a connecting line between the first clamping point and the second clamping point, a direction of the force having at least one component along the longitudinal axis, wherein a position of the test specimen is varied by tilting such that the first clamping point and the second clamping point have a predefined eccentricity with respect to the centroid line to adjust one or more bending moments acting during force application.

11. The method according to claim 10, wherein at least one of the first clamping device or the second clamping device include at least one of: an I-beam, a ball joint, or a universal joint that allows for torsion or bending of the test specimen.

12. The method according to claim 11, wherein the first clamping device and the second clamping device are deflected during the method by no more than 30 degrees.

13. The method according to claim 10, wherein the force is applied at the beginning of the method, or at another predefined point in time of the method.

14. The method according to claim 10, wherein the test specimen is a wind turbine rotor blade, or a sub-component of a wind turbine, or a component of a wind turbine rotor blade.

15. The method according to claim 10, wherein the test specimen has a length in a direction along the applied force of between 1 cm and 15 m.

* * * * *